(12) United States Patent
Hicks et al.

(10) Patent No.: US 7,234,619 B2
(45) Date of Patent: Jun. 26, 2007

(54) ACCESSORY STRIP FOR SECURING ARTICLES WITHIN A VEHICLE INTERIOR

(75) Inventors: Thomas S. Hicks, Livonia, MI (US); Jeffrey A. Kempf, Romeo, MI (US); James M. Hutek, St. Clair Shores, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 470 days.

(21) Appl. No.: 10/701,469

(22) Filed: Nov. 3, 2003

(65) Prior Publication Data

US 2005/0092801 A1 May 5, 2005

(51) Int. Cl.
*B60R 7/00* (2006.01)
*B60R 9/00* (2006.01)
*B62R 11/00* (2006.01)

(52) U.S. Cl. ............ 224/547; 224/482; 224/281; 224/543; 224/441

(58) Field of Classification Search .......... 224/547, 224/545, 555, 483, 482, 281, 278, 543, 544, 224/548, 554, 556, 557, 282, 485, 195, 441, 224/546, 440, 442, 443; 296/24; 248/231.81
See application file for complete search history.

(56) References Cited

U.S. PATENT DOCUMENTS

| | | | | |
|---|---|---|---|---|
| 4,353,588 A | | 10/1982 | Giugiaro et al. | |
| 4,554,692 A | * | 11/1985 | Whitehead | 5/411 |
| 4,969,917 A | * | 11/1990 | Prue | 119/811 |
| 5,387,010 A | | 2/1995 | Mohr | |
| 5,415,457 A | * | 5/1995 | Kifer | 297/188.04 |
| 5,762,244 A | * | 6/1998 | Wagner et al. | 224/281 |
| 5,823,724 A | * | 10/1998 | Lee | 410/104 |
| 5,850,996 A | * | 12/1998 | Liang | 248/221.11 |
| H1834 H | * | 2/2000 | Wilson et al. | 296/97.11 |
| 6,116,485 A | * | 9/2000 | Watkins | 224/275 |
| 6,321,960 B1 | | 11/2001 | Ellis et al. | |
| 6,585,465 B1 | * | 7/2003 | Hammond et al. | 410/104 |
| 6,691,963 B1 | * | 2/2004 | Padiak et al. | 248/220.22 |
| 6,955,280 B2 | * | 10/2005 | Saitoh et al. | 224/269 |

* cited by examiner

*Primary Examiner*—Nathan J. Newhouse
*Assistant Examiner*—Lester L. Vanterpool
(74) *Attorney, Agent, or Firm*—Brooks Kushman P.C.

(57) ABSTRACT

An accessory strip for a vehicle having a bracket secured to a track at select locations. The bracket includes a cam on an inner end that is received by a cam lock bar. The cam is movable within the track to selected positions where it may be locked in place. The bracket may include a dovetail socket to which articles may be secured by means of a dovetail plug and also may include a hook on which articles may be hung by means of flexible handles, or the like. The accessory strip assembly may be attached to an interior wall or may be formed as an integral track on an interior wall or seat back of a vehicle.

16 Claims, 4 Drawing Sheets

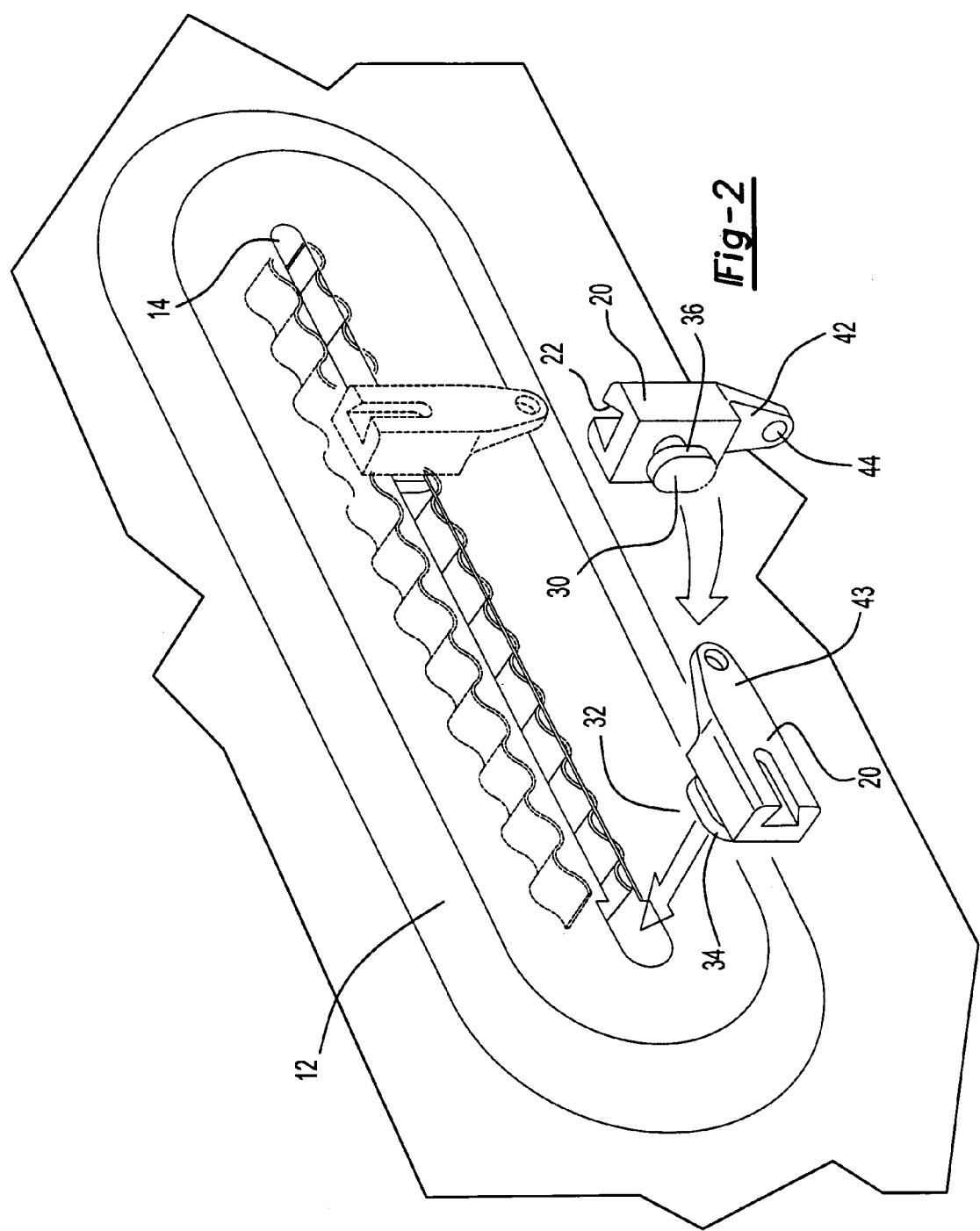

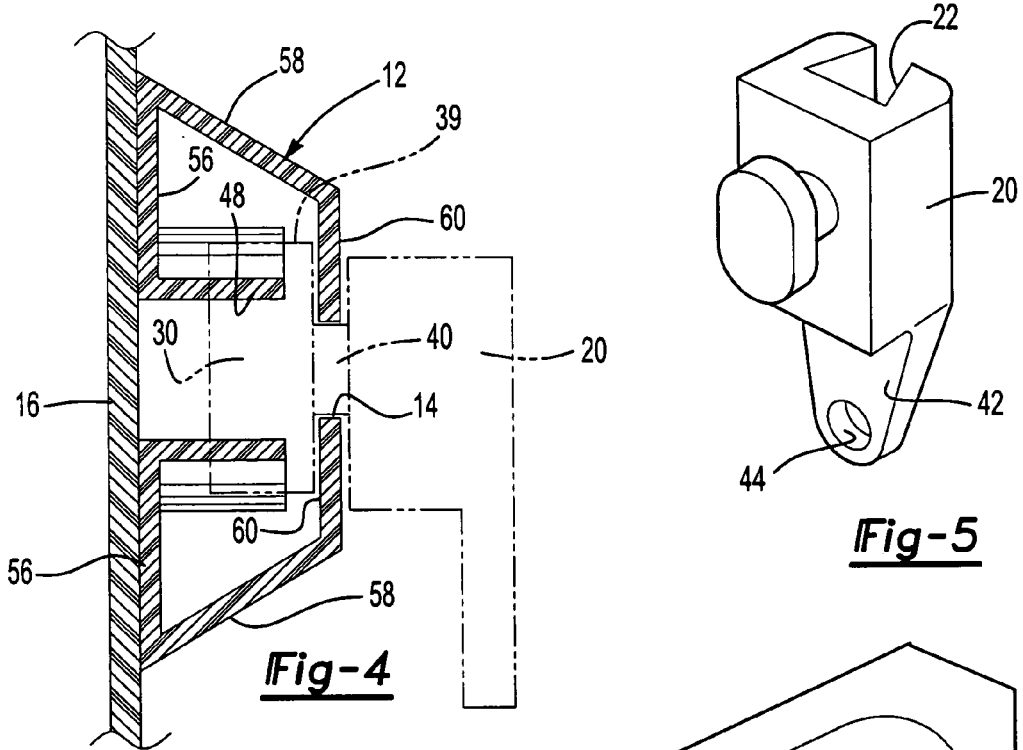
*Fig-4*
*Fig-5*
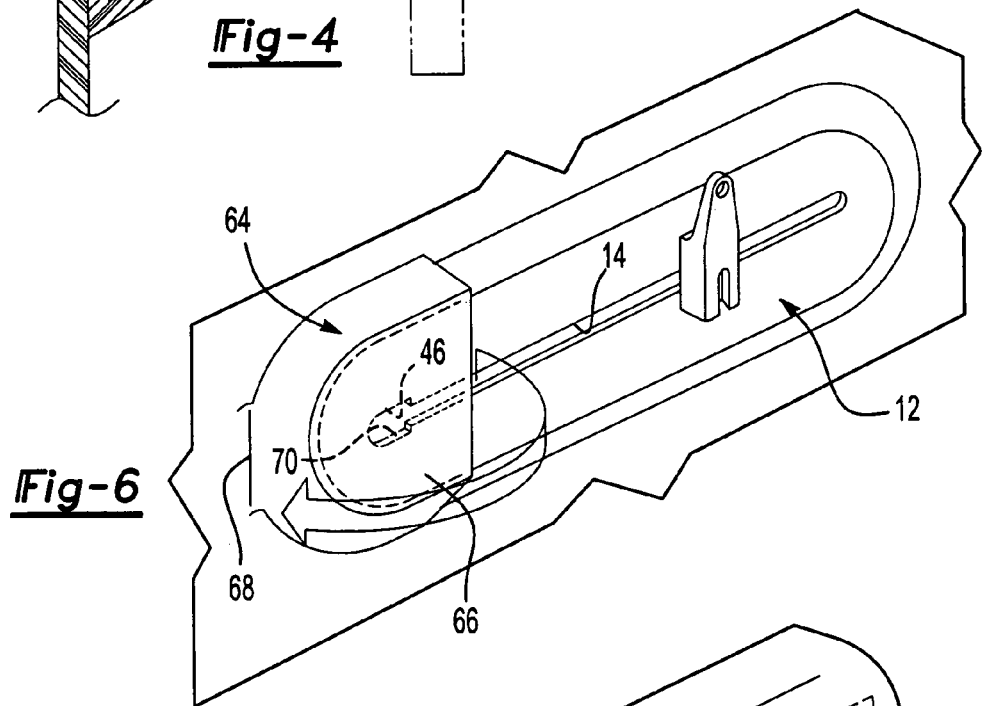
*Fig-6*
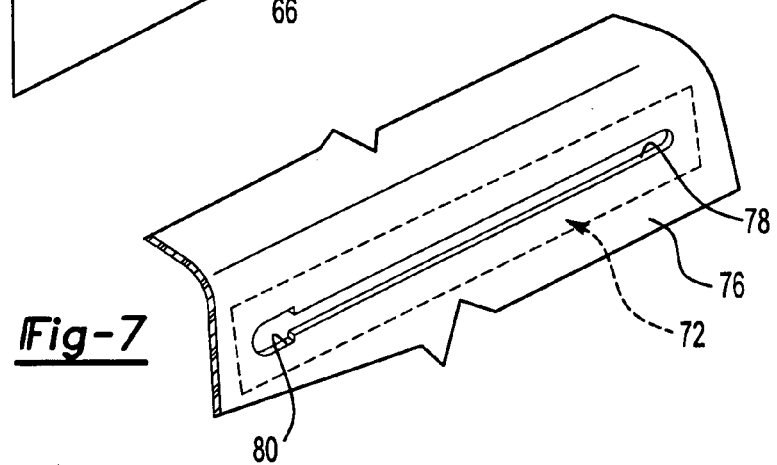
*Fig-7*

ACCESSORY STRIP FOR SECURING ARTICLES WITHIN A VEHICLE INTERIOR

BACKGROUND OF THE INVENTION

1. Field of the Invention

The present invention relates to an article storage apparatus for a vehicle interior.

2. Background Art

Vehicles are used to transport a wide variety of articles. Sedan or coupe style vehicles are generally provided with a trunk for transporting articles. Sport utility vehicles, full size vans, and mini-vans generally are provided with a rear storage area in the rear portion of the passenger compartment of the vehicle. A wide variety of articles are often transported in such vehicles including luggage, grocery bags, golf clubs, sports equipment, and the like. A problem associated with transporting articles in either the trunk area or rear storage area of a vehicle is that unrestrained articles may shift during transportation. If an article moves while being transported, it may be damaged or may impact another object potentially causing damage to that object.

Various restraining devices have been developed to hold objects while being transported in a trunk or rear storage area of a vehicle. One example of a restraining device is a cargo net that may be secured to the back of a vehicle seat, the floor of the trunk, or the floor of the rear storage area. Cargo nets provide a way to secure loose articles within a storage area or trunk but are not popular with consumers because they are not convenient to use and may become tangled with themselves or with articles that are stored within the cargo nets. Another example of a restraining device used in vehicles such as sport utility vehicles or mini-vans is a bag hook that is fastened to an interior surface such as a seat back. Bag hooks are normally permanently fastened to the vehicle interior in set locations and cannot be adjusted to accommodate differently sized objects. Bag hooks are not well suited to support articles such as cases or flashlights that do not have flexible handles that can be hooked over the bag hooks.

There is a need for a simple, unobtrusive accessory for vehicle interiors that facilitates storing a wide variety of articles in the storage area or trunk of the vehicle.

The above problems are addressed and the need is fulfilled by applicants' invention as summarized below.

SUMMARY OF THE INVENTION

According to one aspect of the present invention, an accessory strip assembly is provided for a vehicle. The accessory strip is supported by an interior structure of the vehicle such as a wheel well cover, side wall trim, or seat back of the vehicle. The accessory strip assembly comprises a track that is adapted to be attached to the interior structure. At least one bracket is secured in a lot defined by the track but it is expected that a plurality of brackets will be secured to the track. Each of the brackets has a cam on an inner end and a specially formed receptacle on an outer end. The cam is received in the slot of the track in a range of positions and is selectively locked to the track at a desired position on the track. When the bracket is secured to the track, the receptacle provides a convenient way to secure articles in a desired location. The storage location for an article may be changed by readjusting the position at which the cam is locked onto the track.

According to other aspects of the invention relating to the track, a cam lock bar may be disposed inside the track that extends in a direction that is parallel to the slot of the track. The cam lock bar cooperates with the cam of the bracket. The cam may be placed in a first orientation to move the bracket relative to the track and may be rotated to a second orientation to lock the bracket to the track. The cam lock bar may further comprise two spaced bars that each have an undulating edge that are located in an opposing relationship to define a space between the edges that is arranged in a repeating pattern of narrow and wide areas. The narrow areas defined by the undulating edge of the spaced bars are wide enough to permit a narrow profile of the cam to move along the track while the wide areas are areas where the cam may be turned so that a broad profile of the cam locks the receptacle in the desired position. The track preferably has a key hole opening at a point along the slot, most likely at one end of the slot, into which the brackets may be inserted to be secured to the track.

As an alternative, an end cap having a hinged closure panel may be provided at one end of the track. The end cap may be provided at both ends of the track. The hinged panel would have an open and a closed position. Brackets may be assembled to or disassembled from the track only when the hinged panel is in its open position.

Other aspects of the invention relate to where and how the track is secured to the interior structure. The track may be secured to a visible surface of the interior structure as an add-on attachment. Alternatively, the track may be integrated into the interior structure so that the track is secured to a back surface of the interior structure with the slot being defined by a wall of the interior structure. The interior structure may comprise a side wall of the vehicle that faces the inside of the vehicle. The interior structure may also be a seat back of a vehicle seat to which the accessory strip assembly is attached.

Other aspects of the invention relate to the receptacle formed on the outer end of the bracket. The receptacle may have a hook on which articles may be attached. The hook may also define a hole to which articles may be secured. A bungee cord having spring hooks on its ends may be inserted into the holes defined by hooks of one or more of the receptacles. The bracket may be rotated about an axis of rotation when inserted into the track. The receptacle on the outer end of the bracket may define a holder in a first radial position on the outer end. A dovetail socket may be provided at a second radial position on the outer end of the bracket in which a dovetail plug may be inserted. The dovetail plug may be provided on an article to be supported by the track when the plug is inserted into the socket.

According to another aspect of the invention, the track may be used to support a wide variety of articles. Examples of articles that may be supported on the accessory strip include grocery bags, a flashlight, a first aid kit, an accessory bag, an umbrella, a cooler, and an emergency road kit.

These and other aspects of applicants' invention will be better understood in view of the attached drawings and the following detailed description of the various embodiments of the invention disclosed.

BRIEF DESCRIPTION OF THE DRAWINGS

FIG. 2 is a perspective view of the accessory strip assembly with a track secured to an interior surface and a bracket shown in a position ready to be inserted in the track;

FIG. 4 is a cross-sectional view taken along the line 4—4 in FIG. 3;

FIG. 5 is a rear perspective view of the bracket;

FIG. 6 is a perspective view of an alternative embodiment of the track having an end cap;

FIG. 7 is a fragmentary perspective view of another alternative embodiment wherein the track is formed by a wall of an interior structure.

DETAILED DESCRIPTION OF THE PREFERRED EMBODIMENT(S)

Figure 1:
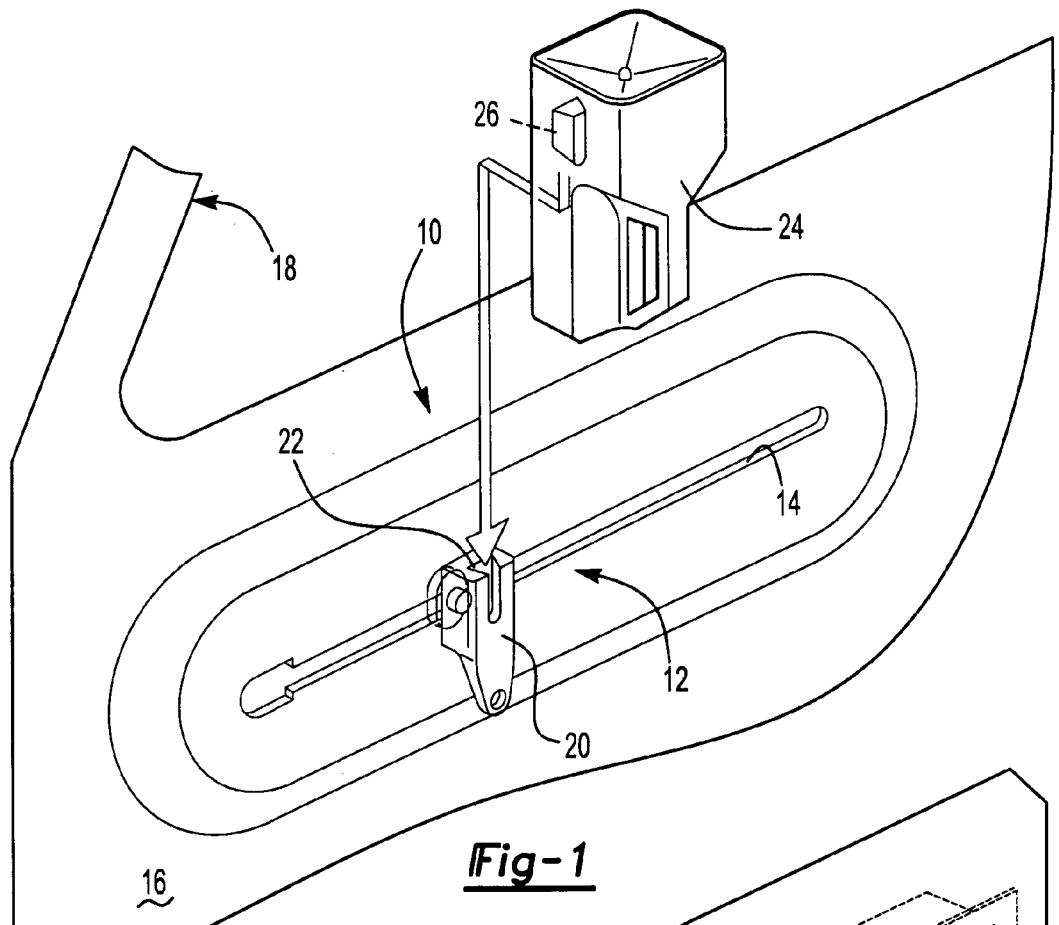
FIG. 1 is a perspective view of an accessory strip assembly attached to an interior surface of a vehicle with a flashlight shown ready to be attached to a bracket inserted on the accessory strip.

Referring to FIG. 1, an accessory strip assembly 10 is illustrated that includes a track 12. The track 12 includes a slot 14. The accessory strip assembly 10 is secured to an interior wall 16 of a vehicle 18. The interior wall 16 may be an interior trim element such as a door panel, center console, instrument panel, wheel well cover, or side wall of the vehicle 18 interior on the "A" surface. Alternatively, the interior wall 18 may be the back surface of a seat back or on a vehicle head liner. A bracket 20 is shown installed on the track 12. The bracket 20 includes a universal receptacle 22, or dovetail socket, that may be used to receive an article to be stored on the accessory strip assembly 10 such as a flashlight 24 that is provided with a dovetail plug 26.

Figure 3:
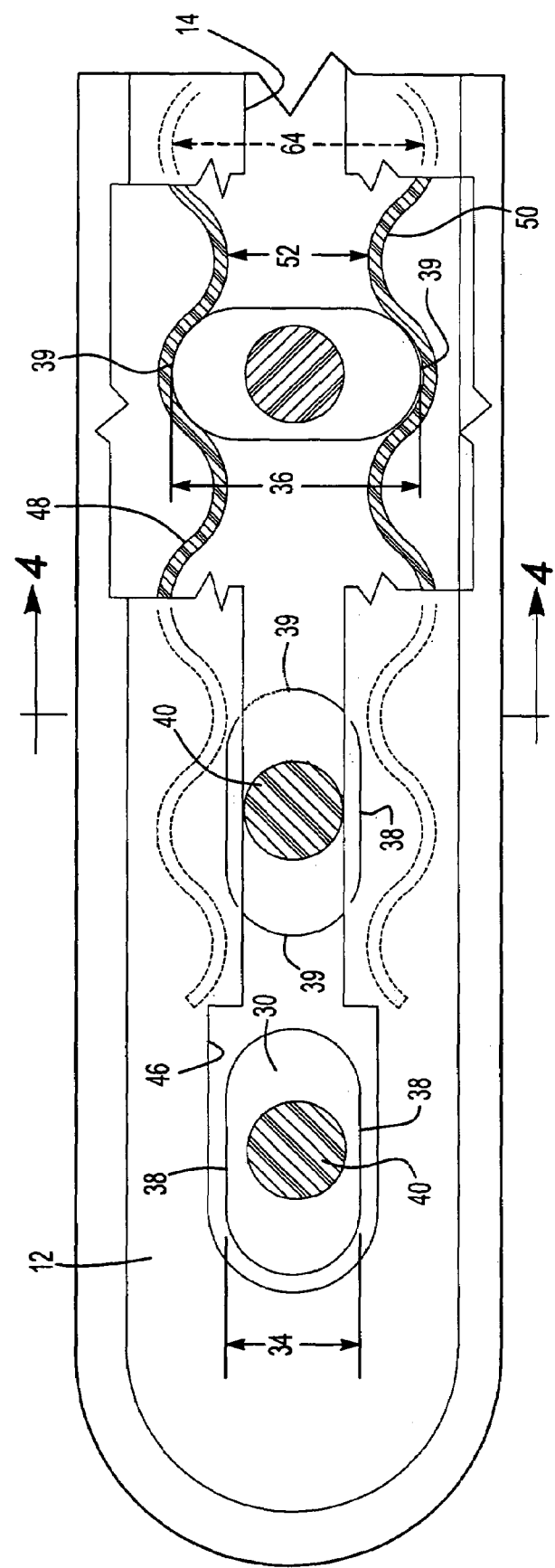
FIG. 3 is an elevation view of an accessory strip assembly with a cam of a bracket shown secured to the track, as it is inserted into the track and as it is moved between positions on the track.

Referring to FIGS. 2 and 3, a cam 30 is provided as part of the bracket 20. The cam 30 is disposed on the inner end 32 of the bracket 20. The cam 30 has a narrow profile 34 and a broader profile 36. As best seen in FIG. 3, the narrow profile 34 is defined between elongated sides 38 while the broader profile 36 is defined between rounded ends 39. The cam 30 is supported on a neck 40. The neck 40 receives the slot 14 of the track 12. The cam 30 is received within the track 12 and may be moved longitudinally within the slot 14. The bracket 20 includes a holder 42 on an outer end 43 that is used to hold items that may be hung from the bracket 20 such as a grocery bag that has a flexible handle. A hole 44 may be provided in the holder 42. The hole 44 may be used to insert a hook or twine may be threaded through the hole 44. A bungee cord having spring hooks at both ends may be secured between two of the brackets 20 by simply inserting the spring hooks of the bungee cord into the holes 44 of two of the brackets 20.

Referring to FIG. 3, the cams 30 of brackets 20 are shown in its insertion position on the left side, in its unlocked or transitory position in the center, and in its locked position on the right side. A key hole 46 is provided on one end of the slot 14. The cam 30 is inserted into the key hole 46 when it is desired to add a bracket 20 to the strip assembly 10. First and second cam lock bars 48 and 50, respectively, are provided behind the track 12. The first and second cam lock bars 48 and 50 extend in the same direction as the slot 14 and cooperate with the cam 30 to permit the bracket 20 to be selectively locked at a selected position along the track 12. The first and second cam lock bars 48 and 50 define narrow areas 52 and wide areas 54. The narrow profile 34 of the cam 30 is of a size to pass through the narrow areas 52 as the cam 30 is moved along the track 12. Wide areas 54 are provided between the first and second cam lock bars 48 and 50 and define the areas where the cam 30 may be locked in place on the track 12. The bracket 20 is rotated so that the broader profile 36 of the cam 30 is placed in alignment with the wide areas 54 defined between the cam lock bars 48 and 50. The broader side 36 of the cam 30 is sized to fit closely within the wide areas 54.

Referring to FIG. 4, the track 12 is shown in greater detail. The track 12 is secured to an interior wall 16 of the vehicle. Attachment walls 56 are formed on the track 12 for mounting the track 12 on the interior wall 16. Beveled surfaces 58 extend between the attachment walls 56 and a track wall 60 to provide an attractive finished appearance for the track 12. The first and second cam lock bars 48 and 50 are shown spaced apart in FIG. 4 and aligned with slot 14. The cam 30 is shown locked with the rounded ends 39 engaging the cam lock bars 48 and 50.

Referring to FIG. 5, the bracket 20 is shown from an inner end perspective. The bracket 20 is shown with a dovetail plug 26 disposed above the dovetail socket 22, or universal receptacle. The dovetail plug 26 may be attached by fasteners or adhesive to articles such as a flashlight, first aid kit, roadside emergency kit, umbrella, or any other item that may be transported in the vehicle. The socket and plug may be provided in another form other than a dovetail but are generally cooperating two-part attachment mechanisms that offer maximum flexibility for storing items on the strip 10. The bracket 20 is shown with the dovetail slot 22 on the upper end of the bracket 20 and with the holder, or hook 42, being oriented in a downward direction. This would be the position that the bracket is in when an article is attached to the bracket 20 by a dovetail plug 26. The bracket 20 may also be installed in an opposite orientation rotated 180° wherein the holder 42 is oriented upwardly. In this orientation, articles such as grocery bags having flexible handles or any other item that has a portion that may be secured over a hook may be placed on the bracket 20. The hole 44 may be used in either orientation.

Referring to FIG. 6, an alternative embodiment is shown wherein the track 12 is finished with an end cap 64. End cap 64 includes a hinged panel 66 that is movable between an open and closed position. As shown in FIG. 6, the hinged panel 66 is closed and would prevent insertion or removal of a bracket 20. The arrow in FIG. 6 illustrates how the hinged panel 66 may be pivoted on a live hinge 68 to its open position. In the open position, the hinged panel 66 reveals either the end 70 of the slot 14 or a key hole 46, shown in phantom. If the end 70 of the track is open, the cam 30 of the bracket 20 may be simply slid into the end 70 of the track 12. If a key hole 46 is provided, the cam 30 may be inserted as described with reference to FIG. 3 above.

Figure 8:
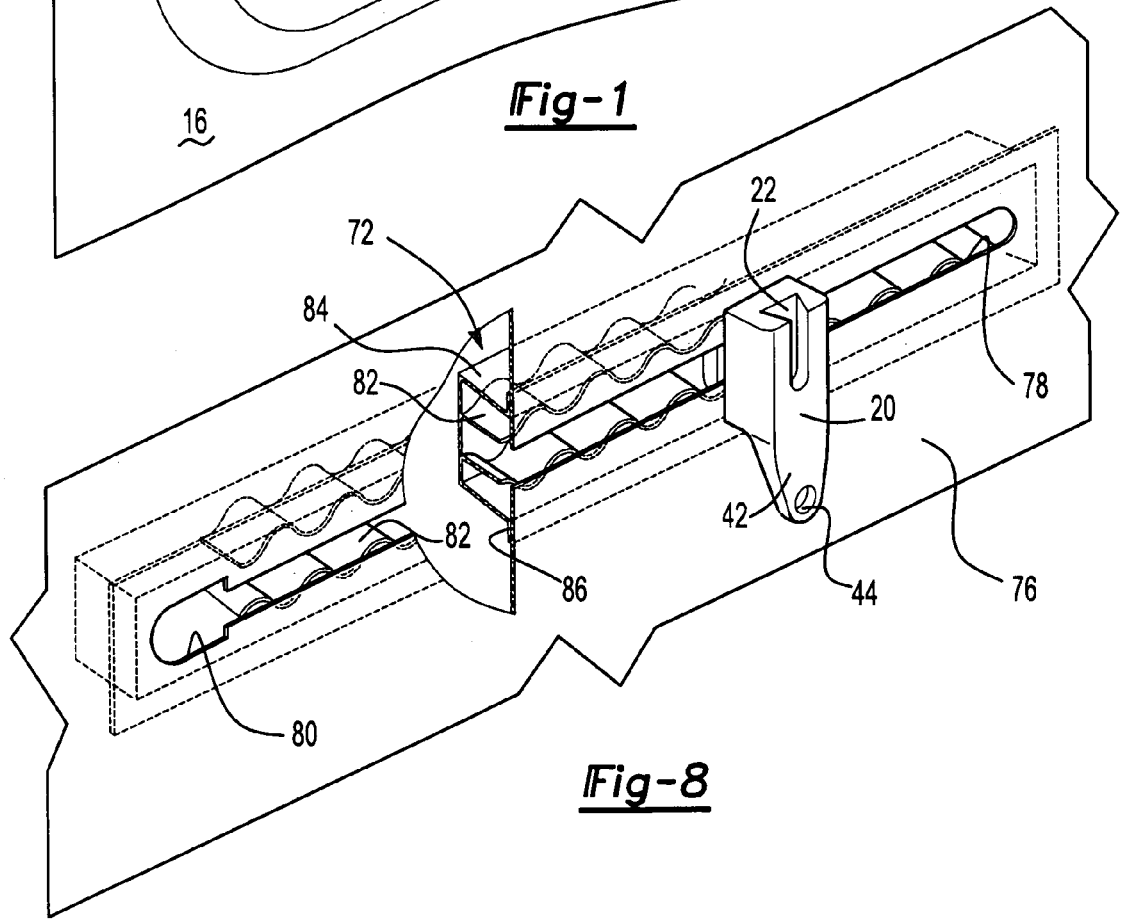
FIG. 8 is a fragmentary perspective view of the alternative track shown in FIG. 7 partially broken away to show the interior structure of the track including a cam lock bar.

Referring to FIGS. 7 and 8, an alternative embodiment is shown in which an integral track 72 is formed as part of an interior wall 76 of the vehicle. A slot 78 is formed in the interior wall 76 and includes a key hole 80 at one end. Cam lock bars 82 function in a manner similar to the first and second cam lock bars 48 and 50, as described above with reference to FIGS. 2 through 4. Cam lock bars 82 are disposed within an enclosure 84 that is mounted to the backside of the interior wall 76. The enclosure 84 has flanges 86 that may be ultrasonically welded to the interior wall 76 or may be connected by means of heat stakes to the interior wall 76.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An accessory strip assembly for a vehicle that is supported by an interior structure of the vehicle, the accessory strip assembly comprising:
   a track having a slot, the track being attached to the interior structure;
   at least one bracket secured to the track, each bracket having a cam on an inner end and a receptacle on an outer end, the cam being received in the slot of the track in a range of positions and being selectively locked to the track at a selected position on the track; and
   wherein the track is open on one end and further comprising an end cap secured to the track over the one end, the end cap having a hinged panel, the hinged panel having an open position and a closed position, wherein the bracket may be assembled to the track when the hinged panel is in the open position.

2. The assembly of claim 1 wherein the track further comprises a cam lock bar disposed inside an interior cavity of the track and extending parallel to the slot, the cam lock bar cooperating with the cam that is placed in a first orientation to move the bracket relative to the track and is placed in a second orientation to lock the bracket to the track.

3. The assembly of claim 2 wherein the cam lock bar further comprises two spaced bars that each have an undulating edge formed by a series of smoothly curved surfaces wherein the bars are located in an opposing relationship to define a space between the edges that is arranged in a repeating pattern of narrow and wide areas.

4. The assembly of claim 1 wherein the track has a keyhole opening at a point along the slot that the brackets are inserted into to be secured to the track.

5. The assembly of claim 1 wherein the track is secured to a visible surface of the interior structure.

6. The assembly of claim 1 wherein a cam lock bar is disposed within an enclosure that is secured to a back surface of a wall of the interior structure.

7. The assembly of claim 6 wherein the enclosure has at least one flange that is provided on opposite sides of the cam lock bar to secure the enclosure to the wall of the interior structure.

8. The assembly of claim 1 wherein the interior structure is a side wall of the vehicle facing the inside of the vehicle.

9. The assembly of claim 1 wherein the interior structure is a seat back of a vehicle seat.

10. The assembly of claim 1 wherein the receptacle on the outer end of the bracket has a hook on which an article may be attached.

11. The assembly of claim 10 wherein the hook defines a hole to which an article may be secured.

12. The assembly of claim 11 wherein the article is a bungee cord having a spring hook that is inserted into the hole defined by the hook.

13. The assembly of claim 1 wherein the bracket has a hook on the outer end and a socket on the outer end and wherein a plug is provided on an article to be supported by the assembly, the plug being adapted to be received in the socket.

14. The assembly of claim 1 wherein the bracket is rotatable about an axis of rotation when inserted in the track and the receptacle on the outer end of the bracket defines a holder oriented at a first radial position and wherein a socket is oriented at a second radial position on the outer end.

15. The assembly of claim 14 further comprising a plug that is provided on an article to be supported by the track when the plug is inserted in the socket.

16. The assembly of claim 1 wherein an article to be supported by the bracket on the track is selected from the group comprising:
   a bag;
   a flash light;
   a first aid kit;
   an accessory bag;
   an umbrella;
   a cooler; and
   an emergency road kit.

* * * * *